(No Model.)  G. H. HARRIS.  2 Sheets—Sheet 1.
CALCULATOR.
No. 352,408.  Patented Nov. 9, 1886.
Fig. 1.
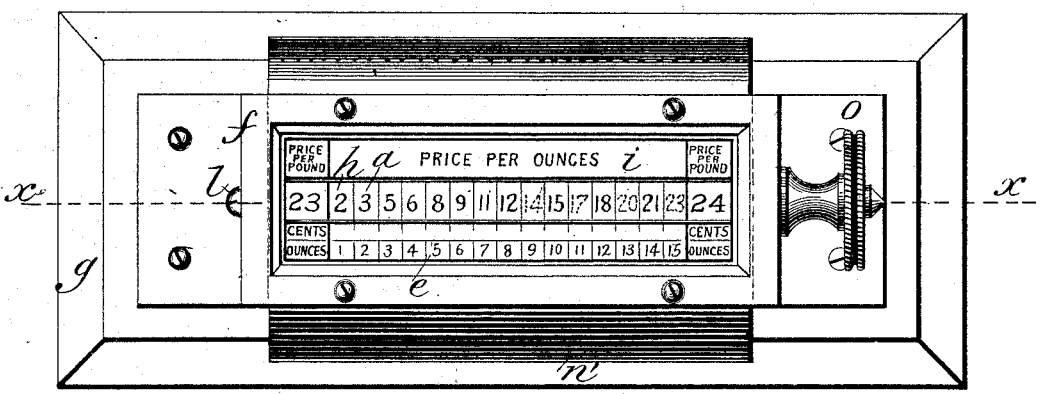
Fig. 2.
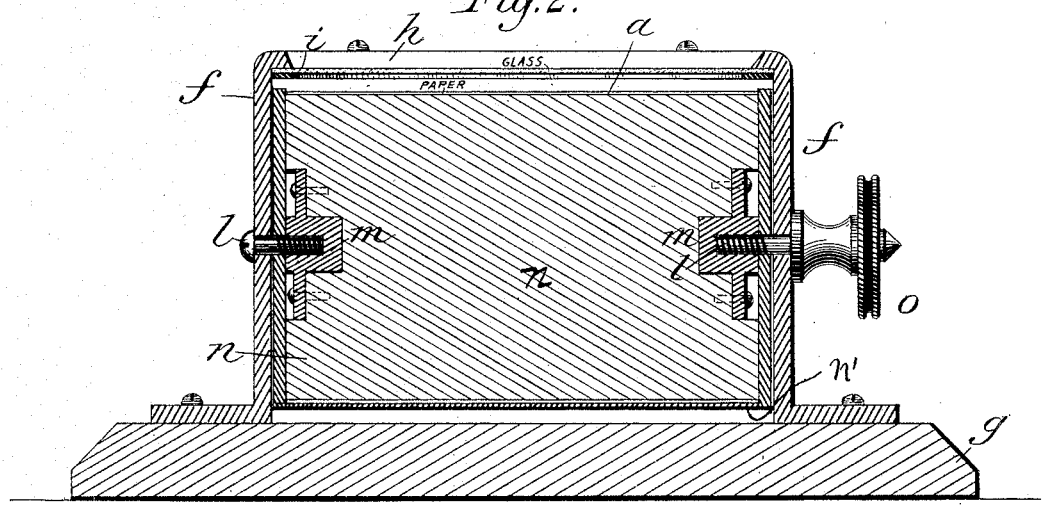
Fig. 3.
Witnesses  Inventor
F. H. Schott  George H. Harris
W. A. Ruff  By his Attorney
  Thos Slade (No Model.) 2 Sheets—Sheet 2.

G. H. HARRIS.
CALCULATOR.

No. 352,408. Patented Nov. 9, 1886.

Fig. 4.

| PRICE PER lb. | Value of each fractional part or unit of measure | | | | | | | | | | | | | | | PRICE PER lb. |
|---|---|---|---|---|---|---|---|---|---|---|---|---|---|---|---|---|
| YARD | 1/16 | 1/8 | 3/16 | 1/4 | 5/16 | 3/8 | 7/16 | 1/2 | 9/16 | 5/8 | 11/16 | 3/4 | 13/16 | 7/8 | 15/16 | YARD |
| OUNCES | 1 | 2 | 3 | 4 | 5 | 6 | 7 | 8 | 9 | 10 | 11 | 12 | 13 | 14 | 15 | OUNCES |

Witnesses

F. H. Schott

W. H. Ruff

Inventor

George H. Harris

By his Attorney

Thos. Slade

UNITED STATES PATENT OFFICE.

GEORGE H. HARRIS, OF BLOOMINGTON, ILLINOIS.

CALCULATOR.

SPECIFICATION forming part of Letters Patent No. 352,408, dated November 9, 1886.

Application filed May 27, 1886. Serial No. 203,464. (No model.)

*To all whom it may concern:*

Be it known that I, GEORGE H. HARRIS, of Bloomington, in the county of McLean, and in the State of Illinois, have invented certain new and useful Improvements in Calculators; and I do hereby declare that the following is a full, clear, and exact description thereof, reference being had to the accompanying drawings, and to the letters of reference marked thereon, making a part of this specification.

My invention relates to an improvement in calculators, the object of the same being to provide a device of the above character by means of which the fractional cost of a pound by ounces may be accurately and quickly determined in whole numbers at a glance at any given price per pound.

A further object is to provide means of the above character which shall produce certain mathematical results, and for all business purposes which it is intended to be used will be practically correct, and consequently will prove in practice a reliable, expeditious, and convenient assistant to retail merchants in expediting business, but more especially in preventing mistakes in estimating the value of any fractional part of a pound at any given price per pound.

A further object is to provide means of the above character which shall be simple and economical in construction and efficient in use.

With these ends in view my invention consists in the certain features of construction and combinations of parts, as will be hereinafter fully described, and pointed out in the claims.

In the accompanying drawings, Figure 1 is a top plan view of my invention, showing the table of computations as used in connection with the frame. Fig. 2 is a longitudinal sectional view thereof on line *x x* of Fig. 1. Fig. 3 is a view in section of the computation-table, and Fig. 4 is a modification of the indicating-tablet.

The computation-table *a* may begin with any desired numeral and may be carried to any given amount. In the present instance, however, it is sufficient for the purpose of illustration to begin with the number 15 and continue in said line with 17, 19, &c., in column *b* to any desired maximum number. Across the sheet, on its adjacent edge, are placed the even numbers in regular order, as shown in column *c*. In general use the maximum figure 99 will be found sufficient.

Between the columns *b* and *c* are located the columns of figures *d*, which are fifteen in number and represent the respective prices of any given number of ounces, the cost of a pound having been ascertained by reference to the columns *b* or *c*.

To clearly illustrate the reading of the table, it will be seen by referring to Fig. 1 that the numbers 23 and 24 appear in the respective columns *b* and *c*, thus denoting the price of an article per pound. The figures in the column *d* represent the cost by ounces, from 1 to 15, when the cost per pound is twenty-three or twenty-four cents. The lower row of figures, *e*, on the tablet *i*, beginning with the numeral 1 and progressing to 15, represents ounces. Thus it will be observed that if a pound cost twenty-four cents twelve ounces will cost eighteen cents, this being the nearest approach in whole numbers.

The figures in dotted lines on the tablet *a* are to give notice that whenever the price per pound is an odd sum of money it will be necessary to deduct one cent from the amount, as indicated, in order to arrive at the most accurate result possible; but in all cases where the price per pound is an even sum of money no deduction whatever should be made.

In estimating the monetary value of a pound at any given price per pound, all fractional parts of a cent are considered as a cent, and is so included in each one of the different results indicated in the table of computations hereto annexed.

Whenever the amount desired is not expressly indicated in the table of computations, it can quickly be ascertained by adding to the amount indicated nearest to the sum desired as many fractional parts of an ounce at the same price per pound as will equal the sum total required. It will be observed in this connection that the fractional part of any abstract or concrete amount or units of measure can with equal celerity be determined—as, for example, suppose it is desired to know how much eighty-six pounds of some commodity will amount to at ten and eleven-sixteenths cents per pound. It is very easy to calculate that eighty-six pounds at ten cents per pound will amount to eight dollars and sixty cents; but to learn what amount eleven-sixteenths of eighty-six is equivalent to requires a certain amount of figuring. The convenience is here illustrated by turning the computation-table until the abstract number "86" in the margin on the right is exposed to view. It will then be noticed that immediately over the fraction "$\frac{11}{16}$" appears the number "60," which is the amount in cents.

The construction of the device is as follows: The cylinder-supporting frame $f$ is secured to base $g$ in any suitable manner, and is provided with the rectangular opening $h$, formed in the top thereof, to which is secured the tablet $i$, the same being provided with the indicating-notes, as shown. The tablet $i$ is further provided with an open space, $k$, of such length and width as to exhibit but one row of figures at a time through the opening $h$. The frame $f$ is provided in each of its standards with suitable holes, forming bearings for the screws $l$, which enter the screw-threaded plates $m$, which are secured to the cylinder $n$, the said cylinder being so adjusted as to permit a free rotation thereof, which is accomplished by means of the knob or wheel $o$, secured centrally to the cylinder. The table $a$ is secured to the cylinder in any desired manner, and revolves therewith. The cylinder is inclosed and the table protected by the casing $n'$, suitably secured to the frame.

The modification shown in Fig. 4 is to illustrate one of numerous changes that the device is capable of undergoing. In this instance the fractional value of a yard at any given price per yard may be readily determined.

The tablet $i$ may be made of any stiff material, the cylinder and case dispensed with, and the tablet movably secured to the table, and by moving the same up and down the result may be readily arrived at. If desired, in estimating the fractional cost of a pound the tablet may be dispensed with.

Having thus fully described my invention, what I claim as new, and desire to secure by Letters Patent, is—

1. In a calculator, the combination, with a rotary cylinder having a computation-table on its surface, said table being provided with a series of numbers, located at each end of the cylinder, denoting the price of a unit, and with intermediate numbers denoting the price of fractional parts of a unit, of a longitudinally-slotted cylinder-casing and a scale of numbers denoting fractional units located outside of the casing along the edge of the slot, substantially as and for the purpose described.

2. In a calculator, the combination, with a series of whole numbers located in columns $b$ and $c$ at the ends of a rotary cylinder, and adapted to denote the price of a whole thing, and sets of whole numbers located on the face of the cylinder between said columns, said sets of numbers having distinguishing features and being adapted to denote the price of fractional parts of a whole, of the slotted casing and the scale of numbers denoting the fractional parts of the whole, arranged substantially as shown and described.

In testimony that I claim the foregoing I have hereunto set my hand this 20th day of May, 1886.

GEORGE H. HARRIS.

Witnesses:
 THOS. SLADE,
 S. R. GRIFFITH.